(12) United States Patent
Rajakarunanayake

(10) Patent No.: US 6,587,883 B1
(45) Date of Patent: *Jul. 1, 2003

(54) SECURE ACCESS FROM A USER LOCATION TO MULTIPLE TARGET SYSTEMS WITH A SIMPLIFIED USER INTERFACE

(75) Inventor: Yasantha Nirmal Rajakarunanayake, San Ramon, CA (US)

(73) Assignee: Covad Communications Group, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,939

(22) Filed: May 10, 1999

(51) Int. Cl.[7] .................. G06F 15/16; G06F 15/173
(52) U.S. Cl. .................................... 709/227; 709/223
(58) Field of Search .................. 709/223, 224, 709/225, 249, 229, 227; 713/200, 201

(56) References Cited

U.S. PATENT DOCUMENTS

| | | | | |
|---|---|---|---|---|
| 4,897,874 A | * | 1/1990 | Lidinsky et al. ............ | 713/201 |
| 5,841,120 A | * | 11/1998 | Bouthillier et al. ......... | 235/382 |
| 5,864,683 A | * | 1/1999 | Boebert et al. ............. | 709/249 |
| 5,898,780 A | * | 4/1999 | Liu et al. .................... | 380/25 |
| 6,092,196 A | * | 7/2000 | Reiche ........................ | 713/200 |
| 6,092,724 A | * | 7/2000 | Bouthillier et al. ......... | 235/380 |
| 6,212,561 B1 | * | 4/2001 | Sitaraman et al. .......... | 709/225 |
| 6,219,792 B1 | * | 4/2001 | Bouthillier et al. ......... | 713/201 |

* cited by examiner

Primary Examiner—Glenton B. Burgess
Assistant Examiner—Tod Kupstas
(74) Attorney, Agent, or Firm—Jung-hua Kuo

(57) ABSTRACT

A telecommunication system which provides secure access from a user system at a user location to target systems at a desired target location ("secure location"). The system is implemented such that connectivity to any other target locations from a user system is disabled when the user system requires connectivity to the target systems at the secure location. By disabling the connectivity, the present invention ensures that access to the target location does not expose the target systems to the risk of unauthorized access. A simple user interface is also provided. The user may select the desired target location from among several target locations, for example, by operating a physical interface on a customer premises equipment (CPE).

16 Claims, 3 Drawing Sheets

SECURE ACCESS FROM A USER LOCATION TO MULTIPLE TARGET SYSTEMS WITH A SIMPLIFIED USER INTERFACE

RELATED APPLICATION

The present application is related to the co-pending U.S. Patent Application Entitled, "A System, Method, and Network for Providing High Speed Remote Access From Any location Connected by a Local Loop to a Central Office", Ser. No. 09/098,020, Filed Jun. 15, 1998, naming as Inventors: Rawson et al (hereafter "RELATED APPLICATION"), and is incorporated in its entirety herewith.

BACKGROUND OF THE INVENTION

1. Field of the Invention

The present invention relates to telecommunication systems, and more specifically to a method and apparatus for providing secure access from a user location to target systems with a easy to use user interface.

2. Related Art

Users at locations such as homes (hereafter "user locations" in general) often access target systems. In a typical scenario, a user uses a user system (e.g., computer system) at a user location to access a target computer system ("target system") of the user's employer. Target computer systems are typically accessed by several users. Places where the target computer systems are located may be referred to as target locations. Other examples of target locations include internet service providers (ISPs) and content providers such as Disney.

Communication between a user system and a target system is typically implemented on a virtual circuit provided on a telecommunication network. The telecommunication network may be implemented using media such as local loops, cable, and wireless technology. An example telecommunication network providing high speed remote access on local loops is described in RELATED APPLICATION noted above.

Telecommunication networks are commonly capable of supporting multiple virtual circuits from user systems. The virtual circuits can connect user systems at a user location to target systems at different target locations. For example, one virtual circuit may connect user systems to a target location related to an employer of the user, and another virtual circuit may connect user systems to a location related to an internet service provider (ISP) ("ISP Location").

The possibility of multiple virtual circuits from a user location is often a concern for owners or operators of the target systems. In the example of the preceding paragraph, the user's employer may be concerned about potential unauthorized access of employer's target systems by an unknown person through the ISP location. That is, an employer may be concerned that a user location may provide the necessary connectivity between systems of such unknown persons and the target systems related to the employer. The possibility of unauthorized access is therefore undesirable in several situations.

Accordingly, what is required is a method and apparatus for providing secure access from a user location to desired target systems.

SUMMARY OF THE INVENTION

The present invention enables a service provider to provide secure access from a user system at a user location to target systems at a target location on a telecommunication network capable of connecting the user to multiple target locations simultaneously. A target location with the need for such secure access is referred to as a secure location. Secure access is provided by disabling connectivity to any other target locations from the user location when the user location is provided connectivity to the secure location. As connectivity is disabled to other target locations (such as ISPs), the target systems at the secure location may not be exposed to the risk of unauthorized access.

In a typical scenario, a customer premises equipment (CPE) is provided at a user location. A virtual connection is provided from the CPE to each of several target locations the user at user location may wish to access. However, when secure access is to be provided, data transfer on all the virtual connections other than the connection to the secure location may be disabled, thereby providing secure access to the desired target location. The virtual circuits may be implemented as permanent virtual circuits (PVCs).

Some example implementations on a telecommunication network facilitating the secure connection are described first. In one example implementation, a PVC is configured on the network between a CPE at a user location and each remote target a user at a user location may wish to connect. However, the CPE is designed such that only the PVC to the secure location can transfer data when the user communicates with the secure location.

In an alternative implementation, only a single PVC may be provided to the CPE at a user location. However, the PVC may be used to connect to any one of several target locations as the user requests. When the user requests a connection, a session is established with an authentication system through a gateway. The authentication system may be implemented with several user identifiers, with each user identifier corresponding to one target location. Thus, the user may be requested to enter a user identifier and a corresponding password, and upon proper authentication, a session is established to a target location corresponding to the user identifier. The sessions to the authentication server and the target location may be implemented, for example, using point-to-point protocols (PPP) well known in the relevant arts.

The manner in which a user may request connection to the secure target location is described now. In one embodiment, a physical switch may be provided on the CPE to enable the user to indicate which target location the CPE is to be connected. When the user indicates the target location by the operation of the physical switch, the CPE provides connectivity to only the indicated target location. For example, in the multiple PVC based approach noted above, the CPE may be designed to transfer data only on the PVC corresponding to the secure location if the user selects connection to the secure location.

Alternative, a profile may be provided for each position of the switch, with each profile providing configuration data for the CPE. Thus, when a user selects a particular position, the CPE may operate from the profile corresponding to that position. The profile corresponding the secure location may disable connections to other target locations. In another variation, the user may select a profile using an appropriate user interface provided, for example, from an end system. When the CPE is made to operate from the selected profile, for example, by rebooting the CPE, the CPE may operate from the selected profile.

It should be understood that the selection mechanisms and implementation of virtual circuits on the telecommunication network(s) noted above are merely examples. Also, different combinations of selection mechanisms, CPE configuration mechanisms, and provisioning of virtual circuits on the shared network can be used without departing from the scope an spirit of the present invention.

Thus, the present invention provides a method and system for providing secure access from a user location to a desired target location ("secure location") by disabling connectivity to any other target locations when the user location is provided connectivity to the secure location.

The present invention provides a simple interface for a user to select a desired target location for secure access by providing mechanisms such as a physical switch which can be operated to select the desired target location, and a user interface from a user system to configure the CPE.

The present invention provides a secure method for providing remote access as only a single PVC may be provided from a user location in one implementation, and the user location may not be able to access target locations other than a secure location when accessing the secure location.

The present invention is particularly suited for companies such as incumbent local exchange carriers (ILECs), competitive local exchange carriers (CLECs), and other companies providing high bandwidth connections between homes and employers as the employers may be concerned about risk of unauthorized access which may be present without the operation of the present invention.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Present Invention

The present invention enables a service provider such as a local exchange carrier (LEC) to provide secure access from a user location to a desired target location ("secure location") on a telecommunication network. The telecommunication network is capable of supporting connections to multiple target locations at the same time. However, in accordance with the present invention, when the user location is connected to the secure location, no other target locations are connected to the user location.

As a result, the risk of unauthorized access of target systems at the secure location may be minimized or eliminated. However, when the user is not accessing secure location, the user can access several other target locations, potentially simultaneously (at the same time).

In addition, at least in some implementations, the user may be provided a simple mechanism by which secure access to a desired secure location may be requested. For example, the user may need to operate a physical switch to request connection to the secure location, and the corresponding user location is connected to only the requested secure location.

The present invention is described below with reference to several examples. Specifically, for the purpose of illustration, the present invention is described with reference to a user location connected to a telecommunication network by permanent virtual circuits (PVCs) implemented on local loops. However, it should be understood that the present invention can be implemented in several other environments as well.

2. Example Environment

Figure 1:
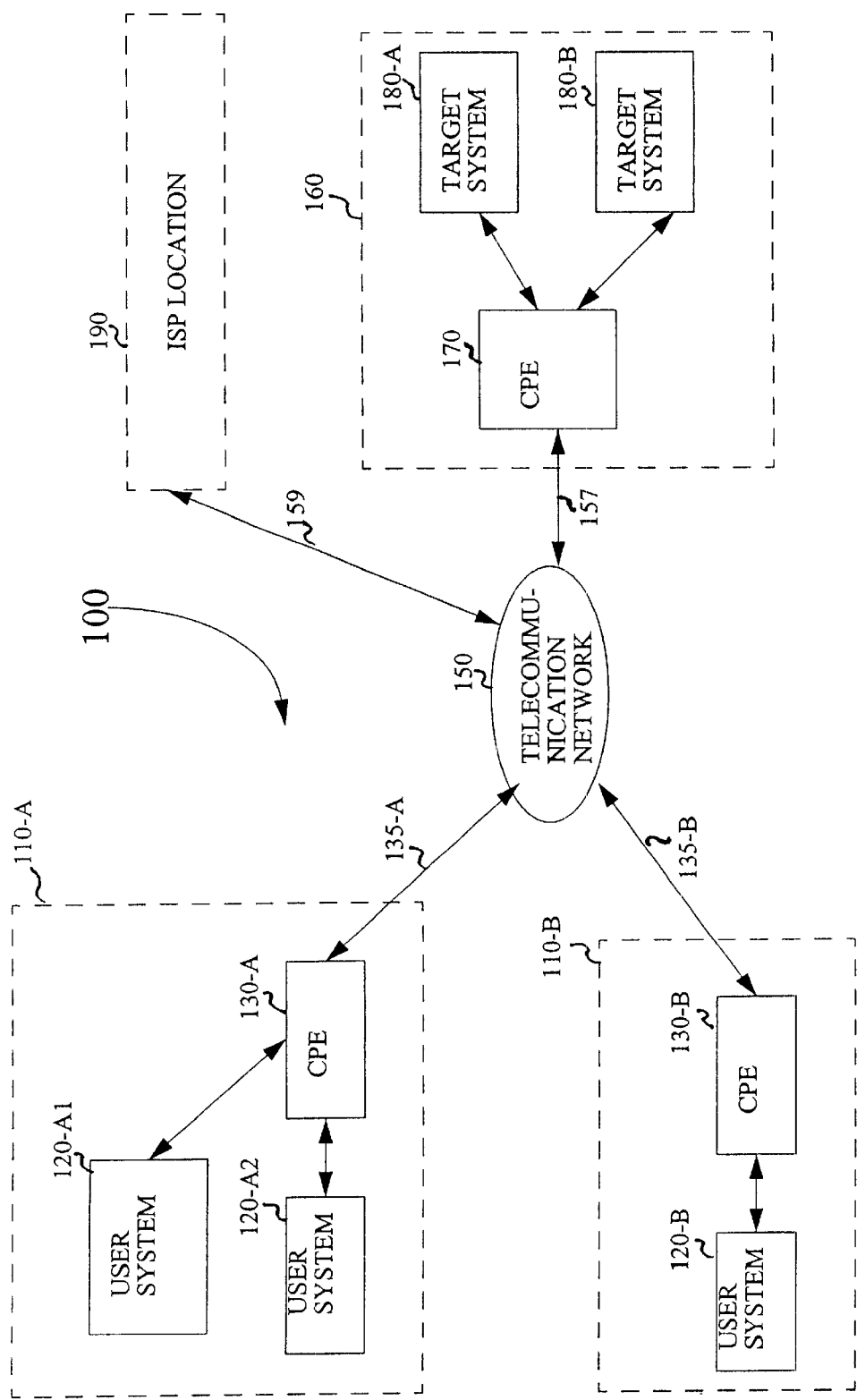
FIG. 1 is a block diagram illustrating an example environment in which the present invention can be implemented.

FIG. 1 is a block diagram of an example telecommunication system 100 in which the present invention can be implemented. Telecommunication system 100 may include user locations 110-A and 110-B, telecommunication network 150, target location 160 and internet service provider (ISP) location 190. For simplicity and clarity, only two user locations and two target locations (ISP location 190 also being an example of a target location) are included in telecommunication system 100. In reality, telecommunication system 100 typically includes several more user locations and target locations.

User location 110-A is shown with user systems 120-A1 and 120-A2, and CPE 130-A. User location 110-B is shown including user system 120-B and CPE 130-B. CPEs 130-A and 130-B may be connected to telecommunication network 150 by local loops 135-A and 135-B respectively. For conciseness, the invention is described below substantially with reference to CPE 130-A and user systems 120-A1 and 120-A2 in user location 110-A only. However, the description is applicable to user system 120-B and CPE 130-B provided in user location 110-B also.

ISP location 190 is an example of a target location accessed by the users at user locations 110-A and 110-B. ISP location 190 may receive data from (and send data to) user locations 110-A and 110-B on bandwidth line 159. For the purpose of appreciating the present invention, it is sufficient to understand that the users may access several systems on the world wide web through the systems provided in ISP location 190.

Telecommunication network 150 may be configured to provide several virtual circuits to CPE 130-A. In an embodiment described in further detail in the co-pending United States Patent Application Entitled, "A System, Method, and Network for Providing High Speed Remote Access From Any location Connected by a Local Loop to a Central Office", Ser. No. 09/098,020, Filed Jun. 15, 1998, naming as Inventors: Rawson et al ("RELATED APPLICATION"), and is incorporated in its entirety herewith, telecommunication network 150 is implemented to interface with user locations 110-A and 110-B using DSL technology over local loops 135-A and 135-B respectively.

At least in such an embodiment, the virtual circuits may be provided as PVCs, and the present invention is described below substantially with reference to PVCs. Specifically, a virtual circuit may be provisioned for CPE 170, and another virtual circuit may be provisioned between for ISP location 190. The virtual circuits serve as a basis for the connection paths to the respective target locations 160 and 190. A connection path is implemented on a virtual circuit, and provides the transport for a user application.

Target location 160 contains target systems 180-A and 180-B, and CPE 170. CPE 170 is designed to received data from and send data to user locations 110-A and 110-B on bandwidth line 157. For illustration, it is assumed that an employer of a person at user location 110-A owns (and or operates) target location 160. Accordingly, a user at user location 110-A may wish to access target systems 180-A and 180-B in target location 160. However, the users at user location 110-A may have simultaneous access to ISP location 190 also.

The potential for simultaneous (at the same time) access of both target location 160 and 190 may expose target systems 180-A and 180-B to the risk of unauthorized access from the systems of unknown third parties through a path including ISP location 190, user location 110-A, telecommunication network 150 and CPE 170. In other words, when other target locations are accessed from user location 110-A, the target systems at target location 160 may be exposed to the risk of unauthorized access. Such unauthorized access may be undesirable.

An employer (owner of target location 160) may wish to ensure no such unauthorized access is possible before permitting remote access connection from user location 110-A. The present invention ensures such unauthorized access is prevented as described below in further detail. Target location 160 may be referred to as a secure location as the present invention attempts to prevent unauthorized access.

3. Method

Figure 2:
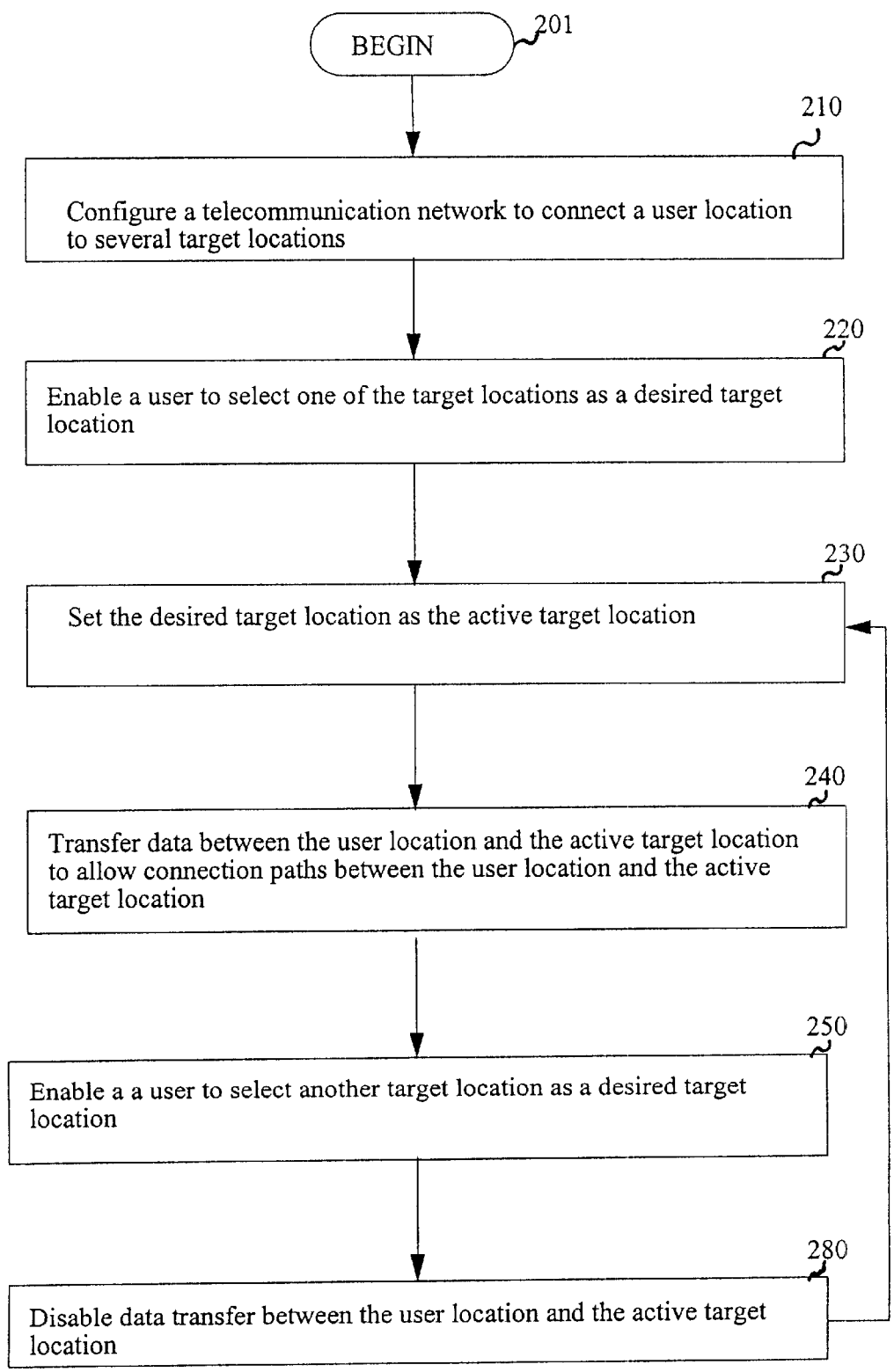
FIG. 2 is a flow-chart illustrating a method using which secure access can be provided from a user location to a desired target location.

FIG. 2 is a flow-chart illustrating a method in accordance with the present invention. For purposes of illustration, the flow-chart is described with reference to FIG. 1. The method begins in step 201 and control passes to step 210. In step 210, telecommunication network 150 is configured to enable CPE 130-A to communicate with different target locations. In general, telecommunication network 150 is capable of supporting connections to many of such target locations simultaneously. Step 210 is illustrated with references to some examples below.

In step 220, a user is provided an option to select one of the several target locations as a desired target location. Several examples for enabling the user to select a desired target location is described below. In step 230, the selected target location is set as an active target location. A target location may be referred to as an active target location at a specified point in time, if the target location can communicate with user location 110-A at that point in time.

For purposes of illustration, it may be assumed that a user has selected target location 160 as the desired target location, and thus at the end of step 230, the active target location is target location 160. As described below in further detail, the present invention ensures that no other target locations can be accessed from user location 110-A during the period target systems 180-A and 180-B are being accessed from user location 110-A.

In step 240, telecommunication network 150 transfers the data to provide connectivity between the active target location (target location 160 in the present illustration) and user location 110-A. The transferred data can be a basis for several connection paths, with each connection path serving a different user application (email, video conferencing, database accesses). However, all such connection paths are provided between the active target location and user location 110-A.

In step 250, the user may select another target location to connect to. For illustration, the user may be assumed to have selected ISP location 190 in step 250. Step 250 may be implemented similar to step 220. Once the user selects a new target location as a desired target location, data transfer may be disabled from and to the active target location set in step 230. As would be readily apparent, disabling the data transfer disables the connectivity between user location 110-A and the active target location. The data transfer may be disabled in one of several ways. Some example implementations are described below.

From step 250, control passes to step 230. In step 230, the desired target location selected in step 250 is set as the active target location. Data transfer continues between the active target location and user location 110-A.

Thus, as connection path(s) to all other target locations are disabled when user location 110-A communicates with target location 160, target systems 180-A and 180-B may not be exposed to the risk of unauthorized access from other target locations. The implementation of some of the above steps are illustrated with examples below.

4. Configuration of Telecommunication Network

In one embodiment, telecommunication network 150 is implemented using ATM technology well known in the relevant arts. Accordingly, one PVC may be provisioned between CPE 130-A and CPE 170, and another PVC may be provisioned between CPE 130-A and ISP location 190. Telecommunication network 150 may be configured in a known way to provision the PVCs. Thus, when a user selects target location 160 as the desired target location, data transfer on the PVC to target location 160 may be enabled and data transfer on the PVC to ISP location 190 may be disabled. One example implementation for such enablement and disablement is described below.

Figure 3:
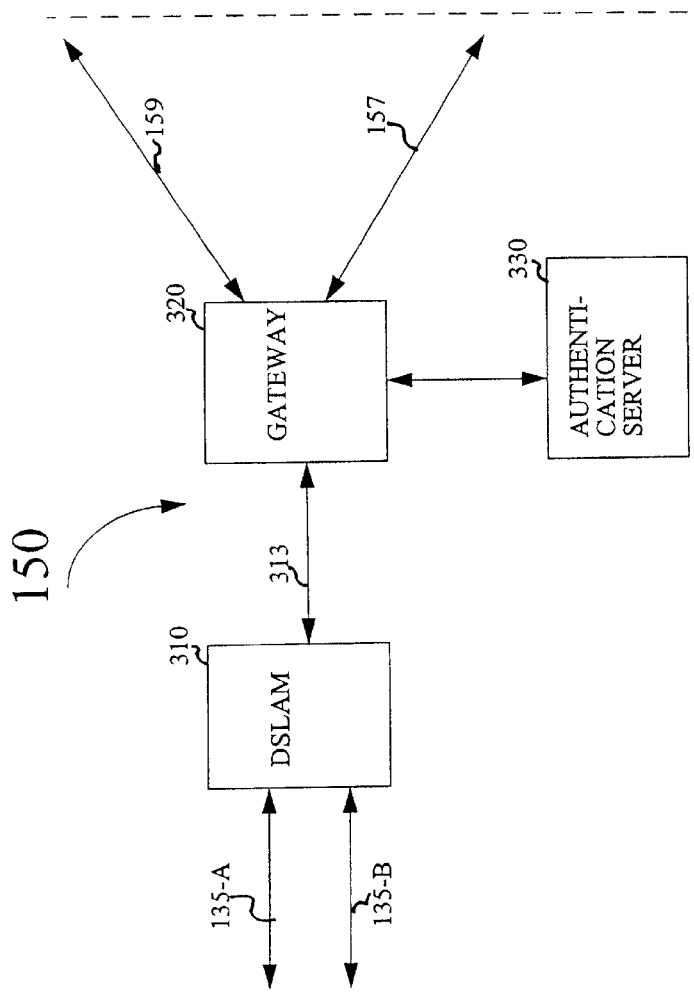
FIG. 3 is a block diagram illustrating the details of implementation of a telecommunication network in one embodiment.

In an alternative embodiment described with reference to FIG. 3, DSL access multiplexor (DSLAM) 310 provides the physical and electrical interface to user locations on local loops 135-A and 135-B. Gateway 320 and authentication server 330 may be implemented to provide secure connections to secure location 160. Specifically, authentication server 330 may be pre-configured with different user identifiers and corresponding authentication information, with each user identifier being related to a different target location. The manner in which the user identifiers may be used is described in further detail below.

A single PVC may be provided to CPE 130-A. When a user wishes to access any target location using one of user systems 120-A1 or 120-A2, a session is established with authentication server 330. The session may be established using well-known protocols such as point-to-point protocol (PPP).

Authentication server 330 may provide a convenient user interface for the user to enter a user identifier and authentication information. The information entered for authentication may uniquely identify the desired target location (of steps 220 and 250). For example, a user identification information as an employee of the owner (or operator) of target location 160 may indicate that the user needs to be connected to target location 160, and a user identification indicating that it is employee's spouse may indicate that the user needs to be connected to ISP location 190. Authentication server 330 may authenticate the user (or user identification and authentication information combination) in a known way.

Once the desired target location is determined according to the authentication scheme, a new session is established to the determined target location. This new session can also be implemented using PPP. When the user ends the session to the target location, the user may again need to be authenticated by authentication server 330. In an embodiment, authentication server 330 may be implemented using Product SMS1000 available from Redback Networks, Inc., 1389 Moffett Park Drive, Sunnyvale, Calif. 94089-1134 USA, Phone Number: 408-548-3500. In that embodiment, gateway 320 is implemented using Cisco 6400 product available from Cisco Systems, Inc., 170 West Tasman Dr., San Jose, Calif. 95134.

Thus, telecommunication network 150 can be implemented to ensure that user location 110-A cannot communicate with any other target location when user location 110-A communicates with target location 160 (secure location). Accordingly, secure access is provided to target location 160. However, the user may need to select the desired target location. Some example approaches which work with the above-described embodiments of telecommunication network 150 are described below.

5. Selecting Desired Target Location

Figure 4:
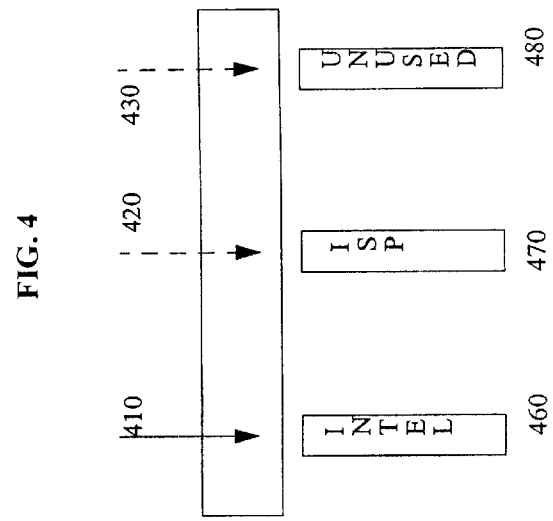
FIG. 4 is a diagram illustrating one interface by which a user may select one of the target locations to which access is required.

Several approaches can be used to enable a user to select a desired target location. In one embodiment described with reference to FIG. 4, a physical switch may be provided on CPE 130-A. The physical switch at position 410 can be operated (e.g., moved manually to different positions) to select among the available PVCs. A visual display is associated with each of the positions of the switch, and the visual display may be implemented to display the target location which is the active target location (as noted in step 240 of FIG. 2). Visual displays 460, 470 and 480 correspond respectively to positions 410, 420 and 430 and respectively indicate that the selection corresponds to 'Intel' (employer at target location 160), ISP (ISP location 190), and 'UNUSED' position.

Thus, physical switch at position 410 (as shown in solid arrow) indicates that the CPE 130-A provides connectivity to 'Intel'. If the physical switch is moved to position 420 (shown as dotted arrow), CPE 130-A provides connectivity to the ISP as ISP location 190. An interface (e.g., from user system 120-A1) can be provided to configure the text identifying the target location corresponding to each position of the physical switch. The implementation of the physical switch and associated display on CPE 130-A will be apparent to one skilled in the relevant arts based on the disclosure provided herein. A user may operate the physical switch to select one of the provided PVCs.

Continuing with reference to FIG. 1, once the user selects the desired PVC (or target location), CPE 130-A may require reconfiguration in some embodiments. CPE 130-A may be implemented to dynamically (on the fly without requiring reboot) reconfigure. However, reconfiguration may require configuration data, which is generally provided on a non-volatile memory in CPE 130-A. The data corresponding to each configuration may be said correspond to a profile.

For example, CPE 130-A may provide for multiple 'profiles' with each profile providing for a different configuration. Profiles are implemented at least with several IP routers available in the market place. Thus, when a user selects a PVC by appropriate operation of the physical switch, CPE 130-A may be rebooted with a profile corresponding to the selected PVC. In the alternative, CPE 130-A may be implemented for dynamic (i.e., without requiring rebooting) reconfiguration based on the profile corresponding to the selected PVC.

In an alternative embodiment, the user may be provided a user interface on user systems 120-A1 and 120-A2 to select the desired profile, with only a profile enabling connection to secure target 160 in accordance with the present invention. When the other profiles are selected, a user may connect to multiple target locations simultaneously. CPE 130-A may be rebooted for configuration according to the data in the selected profile.

In yet another embodiment, multiple profiles may be maintained, with each profile storing configuration data for connecting to a specific target location. The user may be provided the option of selecting one of the profiles. A hardware switch type interface described above with respect to selection of PVCs can be used. In the alternative, a windows based interface can be provided from user system 120-A1 to select among the profiles. The profile can provide the configuration data, which causes CPE 130-A to connect to the corresponding target location. In some CPEs available in the marketplace, CPE 130-A may need to be rebooted for the new configuration to be effective.

However, in the case of the authentication approach described above with reference to FIG. 3, the user may need to interface with authentication server 330 to indicate the desired connection by entering the appropriate user identifier and authentication information. As the to user is connected to only one target location at any given time, secure access may be provided to target location 160.

Thus, using at least any of the mechanisms described above, the present invention can ensure that the target systems at any desired target location are not exposed to the risk of unauthorized access from unknown third parties.

The present invention is particularly useful for companies such as incumbent local exchange carriers (ILECs), competitive local exchange carriers (CLECs), and other companies providing high bandwidth connections to locations such as homes as the employers (secure location) may be concerned about the risk of unauthorized access to their target systems when the employees access their target systems.

6. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of providing secure access from a user system at a user location to a target system at a secure location, said method allowing access from said user location to a plurality of target locations including said secure location, wherein said secure access is provided on a telecommunication network capable of supporting connectivity to said plurality of target locations simultaneously from said user location, said method comprising the steps of:

(a) configuring said telecommunication network to provide connectivity from said user location to each of said plurality of target locations, wherein said connectivity is provided via a switch at said user location, said switch having a first switch setting corresponding to said target system at said secure location and at least one other switch setting corresponding to said plurality of target locations other than said secure location;

(b) enabling a user to select a desired target location to which access is to be provided;

(c) disabling the connectivity between said user location and all of said plurality of target locations except said desired target location selected in step (b) by having said switch at said first switch setting if said desired target location corresponds to said secure location; and (d) transferring data between said user system and said desired target location to provide a virtual circuit between said user location and said desired target location, wherein said transferred data provides basis for access of said target system from said user system, wherein the disabling of step (c) ensures that said access from said user system to said target system at said desired secure location is secure.

2. The method of claim 1, wherein step (a) comprises the step of provisioning a virtual circuit from said user location to each of said plurality of target locations.

3. The method of claim 2, wherein said virtual circuit comprises a permanent virtual circuit (PVC) between a customer premises equipment (CPE) at said user location and a CPE at each of said target locations.

4. The method of claim 3, wherein said CPE at said user location provides a physical switch having a first switch position corresponding to said first switch setting and at least one other physical switch position corresponding to said at least one other switch setting, wherein said physical switch is operable by the user to select one of said PVCs.

5. The method of claim 4, wherein a profile is maintained for each of said PVCs, and wherein step (c) comprises the step of disabling data transfer on all of said PVCs except the PVC corresponding to said secure location if said secure location is selected in step (c).

6. The method of claim 3, wherein step (b) comprises the steps of:

(e) providing a profile corresponding to each of said plurality of target locations;

(f) providing an interface on said user system to said CPE, wherein said interface can be used by said user to select one of said profiles; and (g) configuring said CPE according to said profile selected by said user in step (f), wherein said configuration causes said CPE to enable only said PVC related to said desired target location selected in step (b).

7. The method of claim 1, wherein steps (a)–(c) comprise the steps of:

(h) providing a single permanent virtual circuit (PVC) to a customer premises equipment (CPE) at said user location;

(i) providing an authentication session between said CPE and an authentication server when connection is desired from said user location to any of said plurality of plurality of target locations, said authentication session being provided on said single PVC;

(j) authenticating a user based on a user identifier and authentication information received on said session established in step (i), wherein a different user identifier is associated with each of said plurality of target locations; and (k) determining said desired target location according to said user identifier entered in step (h); and (l) providing another session between said user location and said desired target location, wherein step (d) comprises the step of transferring data on said session of step (l).

8. The method of claim 1, further comprising the steps of:

(m) enabling said user to select another desired target location to which secure access is to be provided;

(n) disabling data transfer between said desired target location selected in step (b) and said user location; and (o) enabling data transfer between said user location and said another target location selected in step (m).

9. A system for providing secure access from a user system at a user location to a target system at a secure location, said system allowing access from said user location to a plurality of target locations including said secure location, said system comprising:

a telecommunication network configured to provide connectivity from said user location to each of said plurality of target locations, wherein said connectivity is provided via a switch at said user location, said switch having a first switch setting corresponding to said target system at said secure location and at least one other switch setting corresponding to said plurality of target locations other than said secure location;

means for enabling a user to select a desired target location to which secure access is to be provided;

means for disabling connectivity between said user location and all of said plurality of target locations except said desired target location selected by said user by having said switch at said first switch setting if said desired target location corresponds to said secure location; and means for transferring data between said user system and said desired target location to provide a virtual circuit between said user location and said target location, wherein said transferred data provides basis for access of said target system from said user system, wherein the disabling ensures that said access from said user system to said target system at said secure location is secure.

10. A system for providing secure access from a user system at a user location to a target system at a secure location, said system allowing access from said user location to a plurality of target locations including said secure location, said system comprising:

a telecommunication network configured to provide connectivity from said user location to each of said plurality of target locations, wherein said connectivity is provided via a switch at said user location, said switch having a first switch setting corresponding to said target system at said secure location and at least one other switch setting corresponding to said plurality of target locations other than said secure location;

a first customer premise equipment (CPE) provided at said user location, said first CPE being coupled to said telecommunication network and said user system;

a second CPE provided at said secure location, said second CPE being coupled to said telecommunication network and said target system; and an interface for enabling said user to select one of said plurality of target locations by selecting a corresponding switch setting of said switch, wherein said first CPE, said second CPE, and said telecommunication network are designed to transfer data between said user system and said target system selected by said user, and wherein connectivity is disabled from said user location to all of said plurality of target locations except said secure location if said user selects said secure location.

11. The system of claim 10, wherein a virtual circuit is provisioned from said user location to each of said plurality of target locations.

12. The system of claim 11, wherein said virtual circuit comprises a permanent virtual circuit (PVC) between said first CPE and said second CPE.

13. The system of claim 12, wherein said interface comprises a physical switch on said first CPE at said user location, said physical switch having a first switch position corresponding to said first switch setting and at least one other physical switch position corresponding to said at least one other switch setting, wherein said user can operate said physical switch to select one of said PVCs.

14. The system of claim 13, wherein a profile is maintained for each of said PVCs, wherein said profile corresponding to said one said PVCs selected by said user causes said first CPE to disable all of said PVCs except said one of said PVCs selected by said user.

15. The system of claim 12, wherein a profile is provided for said plurality of target locations, wherein said interface enables said user to select one of said profiles corresponding to said desired target location, wherein said selection causes said first CPE to be configured according to said profile selected by said user, wherein said configuration causes said first CPE to enable only said PVC related to said desired target location.

16. The system of claim 10, wherein a single PVC is provisioned to said first CPE, wherein said telecommunication network comprises:

a digital subscriber loop access multiplexor (DSLAM) coupled to said first CPE by a local loop;

an authentication server for receiving a user identifier and authentication information on a first session established on said single PVC, and wherein said authentication server authenticates said user based on said identifier and authentication information, said authentication server being designed to receive a plurality of user identifiers and corresponding authentication information, wherein each user identifier relates to one of said plurality of target locations; and a gateway coupled to said DSLAM;

wherein said desired target location is determined according to said user identifier received by said authentication server, and wherein a second session is established between said first CPE and a target location corresponding to said user identifier received by said authentication server, wherein said second session provides for the data transfer between said user location and the target location corresponding to the user identifier received by said authentication server.

* * * * *